(12) United States Patent
Cheng et al.

(10) Patent No.: US 8,514,808 B2
(45) Date of Patent: Aug. 20, 2013

(54) METHOD AND FUNCTION FOR MAINTAINING MAPPING BETWEEN MEDIA INDEPENDENT HANDOVER FUNCTIONS AND TRANSPORT ADDRESSES

(75) Inventors: Yuu-Heng Alice Cheng, Piscataway, NJ (US); Yoshihiro Ohba, Englewood Cliffs, NJ (US)

(73) Assignees: Toshiba America Research, Inc., Piscataway, NJ (US); Telcordia Technologies, Inc., Piscataway, NJ (US)

( * ) Notice: Subject to any disclaimer, the term of this patent is extended or adjusted under 35 U.S.C. 154(b) by 765 days.

(21) Appl. No.: 12/258,581

(22) Filed: Oct. 27, 2008

(65) Prior Publication Data

US 2009/0232094 A1 Sep. 17, 2009

Related U.S. Application Data

(60) Provisional application No. 61/036,051, filed on Mar. 12, 2008.

(51) Int. Cl.
*H04W 4/00* (2009.01)
*H04W 36/00* (2009.01)

(52) U.S. Cl.
CPC .................................. *H04W 36/005* (2013.01)
USPC .......................................... 370/331; 455/436

(58) Field of Classification Search
USPC .................. 370/331; 455/436–443
See application file for complete search history.

(56) References Cited

U.S. PATENT DOCUMENTS

| 2002/0193114 | A1* | 12/2002 | Agrawal et al. ............... 455/442 |
| 2005/0025132 | A1* | 2/2005 | Harper et al. .................. 370/352 |
| 2006/0029020 | A1 | 2/2006 | Jung et al. |
| 2006/0140150 | A1 | 6/2006 | Olvera-Hernandez et al. |
| 2007/0110075 | A1* | 5/2007 | Olvera-Hernandez ... 370/395.52 |
| 2007/0153740 | A1 | 7/2007 | Chang et al. |
| 2007/0204155 | A1 | 8/2007 | Dutta et al. |
| 2007/0265008 | A1* | 11/2007 | Feder et al. .................... 455/436 |

OTHER PUBLICATIONS

International Search Report, Jun. 23, 2009, pp. 1-8.
Canadian Office Action dated Jan. 23, 2013, issued in corresponding Canadian patent application No. 2,718,197.

* cited by examiner

*Primary Examiner* — Paul H Masur
(74) *Attorney, Agent, or Firm* — Westerman, Hattori, Daniels & Adrian, LLP

(57) ABSTRACT

A media-independent handover (MIH) environment supports a MIH function that uses a mapping table to communicate with other MIH functions using a MIH transport protocol. The MIH function updates the mapping table upon receipt of a message having fields to invoke an operation. The operation can update an existing mapping or delete a mapping. The operation also can update a lifetime value for a mapping for a particular address. The mapping table includes mappings. A mapping includes a MIH function identifier, a list of transport addresses, and a lifetime value.

22 Claims, 5 Drawing Sheets

|     202      |            204                    |    206    |   208    |
|--------------|-----------------------------------|-----------|----------|
| MIHF ID      | ADDRESS                           | LIFETIME  | APPEND   |
| MN 110       | ADDRESS 120 (11.11.11.23) OR ADDRESS 122 (22.22.22.23) | XXXX | Y/N |
| MN 108       | ADDRESS 118 (11.11.11.32)         | XXXX      | Y/N      |
| MN 106       | ADDRESS 116 (11.11.11.24)         | XXXX      | Y/N      |
|              | ADDRESS 124 (22.22.22.33)         | XXXX      | Y/N      |
| PoS 140      | ADDRESS 142 (33.33.33.11)         | XXXX      | Y/N      |

FIG. 2

METHOD AND FUNCTION FOR MAINTAINING MAPPING BETWEEN MEDIA INDEPENDENT HANDOVER FUNCTIONS AND TRANSPORT ADDRESSES

FIELD OF THE INVENTION

The present invention relates to media-independent handover services over a network. More particularly, the present invention relates to maintaining the media-independent handover function-to-transport mapping to maintain communications via a media-independent handover protocol within the network.

DISCUSSION OF THE RELATED ART

Media-independent handover (MIH) services allow mobile nodes (MN) such as phones or portable devices to move between different access services within a network while maintaining services. IEEE 802.21 is a standard to provide MIH services. Within an IEEE 802.21 environment, the function providing MIH services may be referred to as an MIH function. The protocol defined between MIH function peers may be referred to as the MIH protocol. A MIH function provides different functionalities between different access technologies, such as WiFi and the like.

A MIH function identifier (MIHF ID) uniquely identifies a MIH function. The MIH identifier is used for exchanging MIH protocol messages with a peer MIH function. The MIH function identifier includes an octet-string, such as a network access identifier (NAI) and the like. The MIH protocol messages are transported by a link-layer or higher-layer protocol that is referred to as a MIH transport protocol.

In order for a MIH function to send a MIH protocol message to a peer MIH function, the sending MIH function maps the MIH function identifier of the peer to the transport addresses used by the MIH transport protocol. A transport address of the MIH transport protocol may be a link-layer address or an internet protocol (IP) address depending on the communication layer that the MIH transport protocol operates. Thus, the mapping between the MIH function identifier and the transport address(es) may be referred to as MIHF-to-transport mapping.

A MIH network entity may include a MIH-capable communication node inside the network such as a point of service (PoS) or a MIH non-PoS. In these situations, the MIH function identifier for the MIH network entity is relatively static. When a mobile node, which also is considered a MIH function, communicates with a MIH network entity, the mobile node obtains the MIHF-to-transport mapping associated with the MIH network entity via the dynamic host configuration protocol (DHCP) or domain name system (DNS).

Alternatively, the MIH network entity obtains the MIHF-to-transport mapping associated with the mobile node via a MIH protocol exchange initiated by the mobile node. The peer MIH network entity needs to update the MIHF-to-transport mapping associated with the mobile node to maintain the communication via the MIH protocol when the transport address of the mobile node is changed. This way, the proper mapping is provided to the mobile node so that information is sent to the proper address.

The MIH transport protocol may be any transport protocol defined at link-layer or higher-layer. Some transport protocols are capable of maintaining a state as to whether each transport address is available for message transmission. When such a transport protocol is used as the MIH transport protocol for a peer MIH function, the MIHF-to-transport mapping associated with the peer will not change. The stream control transmission protocol (SCTP) is an example of such a transport protocol.

SCTP detects a transport address that is considered inactive due to errors and unavailable for message transmission by using "heartbeats" that send signals or retransmission timeouts. Further, some MIH transport protocols do not require a restart or reboot when there is a change in the MIHF-to-transport mapping. For example, SCTP with dynamic address reconfiguration extension (RFC 5061) allows the dynamically changing the list of transport addresses maintained by an SCTP instance with a restart.

When the MIH transport protocol operates above link-layer and an IP mobility protocol, such as Mobile IP, is used, the home address of the mobile node may be used as the transport address for the MIH function-to-transport mapping associated with the mobile node. In this case, the MIH function-to-transport mapping does not change. The use of the home address of the mobile node, however, may have the following issues.

In some instances, the mobile node needs to send an MIH message to a peer MIH function before sending a binding update. An example of this situation may be a network-initiated handover with a break-before-make operation in which a link-layer connection to the target network is established after the link-layer connection to the serving network is terminated. The mobile node may send a MIH_Net_HO_Commit response message after establishing the link-layer connection to the target network before performing the IP mobility binding update. In this case, the source IP address of the MIH_Net_HO_Commit response message may be the care-of address used for the target network instead of the home address or care-of address used for the previous serving network in order to work with broader usage instances such as existence of ingress filtering or reverse tunneling.

Another issue is that mobile IP triangular routing increases the latency for transmitting MIH messages used for triggering the handover unless a route optimization method is used. Finally, because MIH services are designed for facilitating seamless inter-technology handover for any mobility management protocols operating at IP or higher layers, not all MIH entities will be using Mobile IP or Mobile IPv6. Implementation of other mobility management protocols, such as session initiation protocol (SIP) mobility, host identity payload (HIP), and IKEv2 mobility and multihoming protocol (MOBIKE) may use MIH to enhance handover performance. Use of the home address in these instances leads to problems and shortcomings while trying to maintain MIH function-to-transport mapping.

SUMMARY OF THE INVENTION

Thus, the disclosed embodiments relate to a method for maintaining mapping between entities within a media-independent handover (MIH) environment. The method includes accessing a mapping table to obtain at least one transport address corresponding to a peer MIH function. The at least one transport address is used by a MIH transport protocol. The method also includes invoking an operation regarding a mapping of the at least one transport address in the mapping table based on a change of a status of the peer MIH function.

According to the embodiments of the present invention, a method for maintaining mapping within a media-independent handover (MIH) network having at least two MIH functions is disclosed. The method includes generating a mapping table at a MIH function. The mapping table includes a mapping having a MIH function identifier, a list of transport addresses and a lifetime value. The method also includes receiving a message at the MIH function from a peer MIH function. The method also includes invoking an operation to update or delete the mapping in response to the message.

Further according to the embodiments of the present invention, a media-independent handover (MIH) function within a network having a MIH transport protocol is disclosed. The MIH function includes a mapping table including a mapping to communicate with another MIH function within the network. The mapping includes a MIH function identifier, a list of transport addresses and a lifetime value corresponding the other MIH function. The MIH function also includes a transport protocol to provide a message from the other MIH function that invokes an operation to maintain the mapping based upon information within the fields of the message.

Further according to the embodiments of the present invention, a method of maintaining mapping at an entity within a media-independent handover (MIH) environment is disclosed. The method includes receiving a message at the entity indicating an operation to be invoked regarding a mapping within a mapping table at the entity. The mapping table is used in communications by the entity. The method also includes performing the operation for the mapping in the mapping table, wherein the operation updates a list of transport addresses in the mapping. The method also includes updating a lifetime value for the mapping based on information within a field in the message.

BRIEF DESCRIPTION OF THE DRAWINGS

The accompanying drawings are included to provide further understanding of the invention and constitute a part of the specification. The drawings listed below illustrate embodiments of the invention and, together with the description, serve to explain the principles of the invention, as disclosed in the claims.

FIG. 2 illustrates a mapping table for use by a MIH function according to the disclosed embodiments.

DETAILED DESCRIPTION OF THE PREFERRED EMBODIMENTS

Reference will now be made in detail to the preferred embodiments of the present invention. Examples of the preferred embodiments are illustrated in the accompanying drawings.

Figure 1:
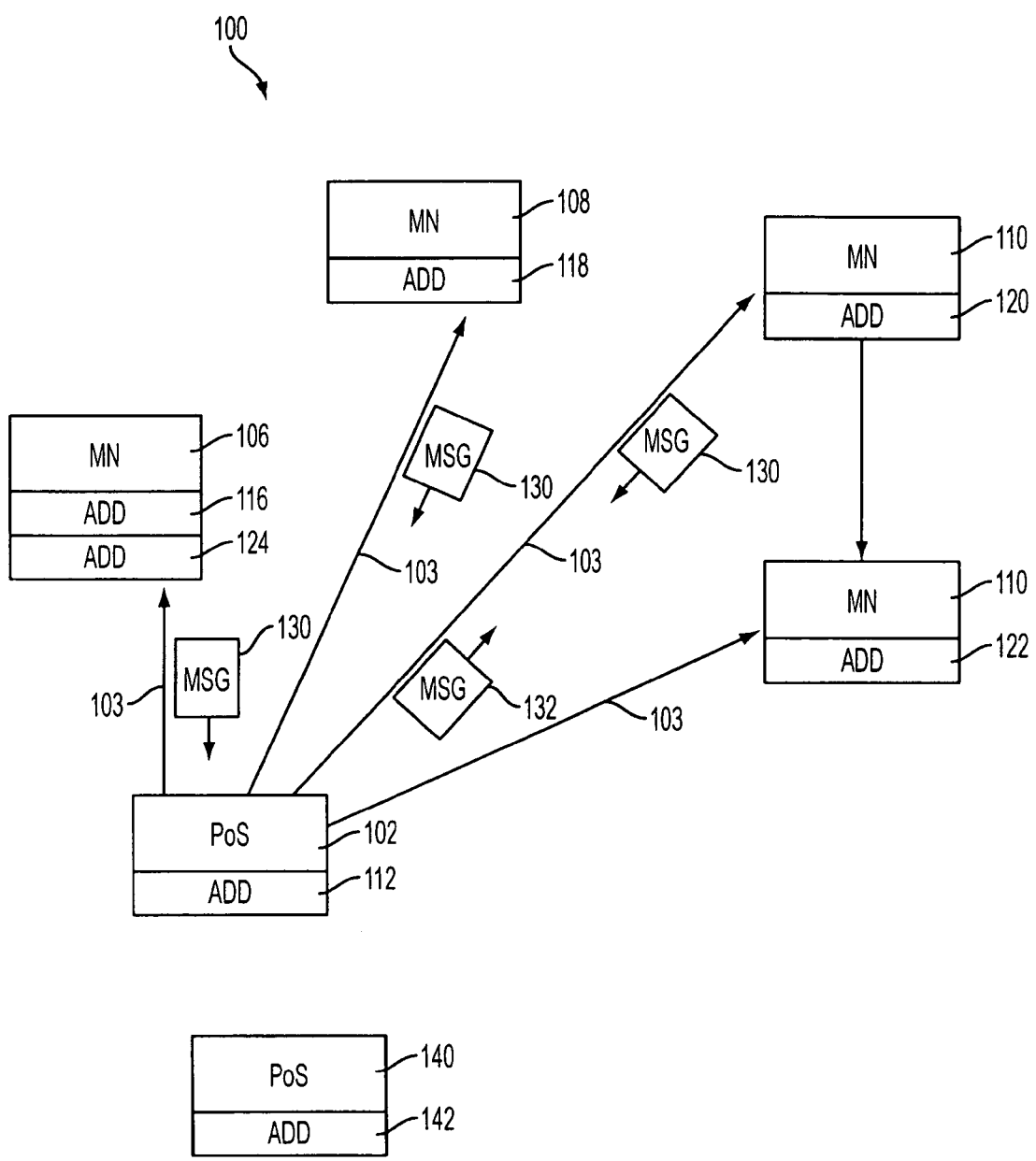
FIG. 1 illustrates a network to provide MIH services using a MIH transport protocol according to the disclosed embodiments.

FIG. 1 depicts a network 100 to provide MIH services by a point of service (PoS), a peer MIH function of a mobile node, using an MIH transport protocol operating above link-layer and IP address as a transport address. The disclosed embodiments may be applicable where a MIH transport protocol operating at link-layer is used, and a link-layer address is used as the transport address. The MIH transport protocol allows the MIH functions to stay in contact with other peer MIH functions, such as mobile nodes, despite handover to different access points.

The disclosed embodiments also may be applicable where a mobile node has multiple interfaces such that one interface uses a MIH transport protocol operating above link-layer and an IP address is used as the transport address, and another interface uses a MIH transport protocol operating at link-layer, and a link-layer address is used as the transport address.

Referring to FIG. 1, network 100 includes PoS 102 that serves a plurality of mobile nodes within network 100. PoS 102 provides a service or function within network 100. FIG. 1 shows mobile node 106, mobile node 108 and mobile node 110. These entities also include a transport address that identifies them to transport protocol 103 within network 100. For example, PoS 102 includes an IP address 112. IP address 112 may be in a format, such as 33.33.33.24. Alternatively, other formats may be used for the addresses corresponding to transport protocol 103. For example, the addresses may be in an IPv6 compatible format.

When calling for the function provided by PoS 102, IP address 112 is designated by the requesting mobile node. MIH transport protocol 103 defines the procedures to use the IP addresses as transport addresses within network 100. The disclosed embodiments allow any MIH function, such as PoS 102 or mobile nodes 106, 108 and 110, to map identifications of peers to the transport addresses used by transport protocol 103.

Mobile node 106 includes IP address 116, mobile node 108 includes IP address 118 and mobile node 110 includes IP address 120. Within network 100, mobile nodes 106, 108 and 110 may have these addresses mapped as transport addresses usable by transport protocol 103. This feature makes mobile nodes 106, 108 and 110 available to receive services from PoS 102 For example, IP address 116 may be 11.11.11.24 for mobile node 106, IP address 118 may be 11.11.11.32 for mobile node 108 and IP address 120 may be 11.11.11.23 for mobile node 110. PoS 102 maps these addresses to a mapping table 200, disclosed below, as transport addresses.

The above-referenced IP addresses may not be the only ones available for the mobile nodes within network 100. In other words, more than one IP address may be assigned to a mobile node. For example, mobile node 110, however, has IP address 120 but receives a new IP address 122 when it is handed over to another IP subnet within network 100. Using the above example, new IP address 122 may be 22.22.22.23. In this case, mobile node 110 may not be able to use the two IP addresses at a time. In other words, mobile node 110 may not be able to use IP address 120 once it configures IP address 122 to its interface.

Mobile node 106 utilizes two interfaces. One interface uses IP address 116, as disclosed above. The other interface uses a different IP address, and this feature is reflected in any mapping tables used by PoS 102. In this example, mobile node 106 uses IP address 124 for the second interface address with a numeral designation of 22.22.22.33.

PoS 140 also is shown within network 100. PoS 140 includes IP address 142 (33.33.33.11). PoS 140 may provide a different service than PoS 102 to peer MIH functions. PoS 140 also may maintain its own separate mapping table of the entities within network 100.

Mobile nodes 106, 108 and 110 initiate MIH messages 130 to PoS 102 using transport protocol 103. Within MIH messages 130, the MIH function identifiers for the mobile node sending message 130 will be contained, along with the destinations. The source and destination transport addresses correspond to the IP addresses of the different MIH functions.

The addresses of the source and destination MIH function entities are contained in the internet protocol (IP) or link-layer protocol data unit (PDU) carrying message 130. PoS 102 uses the source MIH function identifier, such as MN 106, and the source transport address, such as address 116, carried within message 130 to maintain the MIH function-to-transport mapping.

PoS 102 will have a MIH function-to-transport mapping table 200 as shown in FIG. 2. Mapping table 200 is updated when a change occurs in the status of the transport addresses of a mobile node, such as an address update or deletion. Mapping table 200 lists the MIH function identifiers for the mobile nodes in column 202 and the IP addresses assigned to the mobile nodes in column 204. Column 206 represents the lifetime of an existing MIH function-to-transport mapping. Column 208 represents the append value of whether an existing mapping should be appended or replaced. The append values of column 208, preferably, are Boolean values to indicate a "yes" or "no" status.

Mapping table 200 shows the different relationships for the mobile nodes and their addresses through mappings 210-218 in the rows. Mapping 210 pertains to mobile node 110, which includes one of the two IP addresses 120 and 122, depending on the IP subnet to which mobile node 110 is currently attached. Thus, as shown in FIG. 2, mapping 210 depicts mobile node 110 as being able to use IP address 120 or IP address 122.

Mapping 212 shows mobile node 108 and its address 118. Mapping 214 for mobile node 106 is shown to reflect IP addresses 116 and 124 for the two interfaces. Mapping 218 may represent the MIH function identifier for PoS 140 and its address 142. PoS 102 may refer to the mappings shown in FIG. 2 to quickly determine where a message 130 is supposed to go in the MIH environment.

Network 100 may include additional mobile nodes and entities, not shown in FIG. 1, which would be listed in mapping table 200. As PoS 102 receives messages 130, mapping table 200 is updated, or modified, as needed. Thus, PoS 102 does not wait until a command or instruction is specifically sent to change mapping table 200, as it is done automatically.

The following operations may be invoked to maintain a MIH function-to-transport mapping, such as mapping 210. The operations are disclosed in greater detail below. An update address operation may update the transport address or addresses of a mapping. The update address operation may create a new mapping within mapping table 200 or modify an existing mapping, with a new list of transport addresses. Another operation may be a delete mapping operation to remove an existing mapping from table 200. An update lifetime operation may be used to update the lifetime value, shown in column 206, of an existing mapping.

Several solutions for each operation may be implemented. Each solution may be further categorized as using an existing MIH protocol message or a new MIH protocol message. The solutions are orthogonal to each other, and may be combined without impacting the operation of other solutions. Although the operations disclosed below refer to how PoS 102 maintains MIH function-to-transport mapping associated with mobile nodes, the operations may be applied to any MIH entities, such as PoS 140 or any of mobile nodes 106, 108 and 110.

Figure 3:
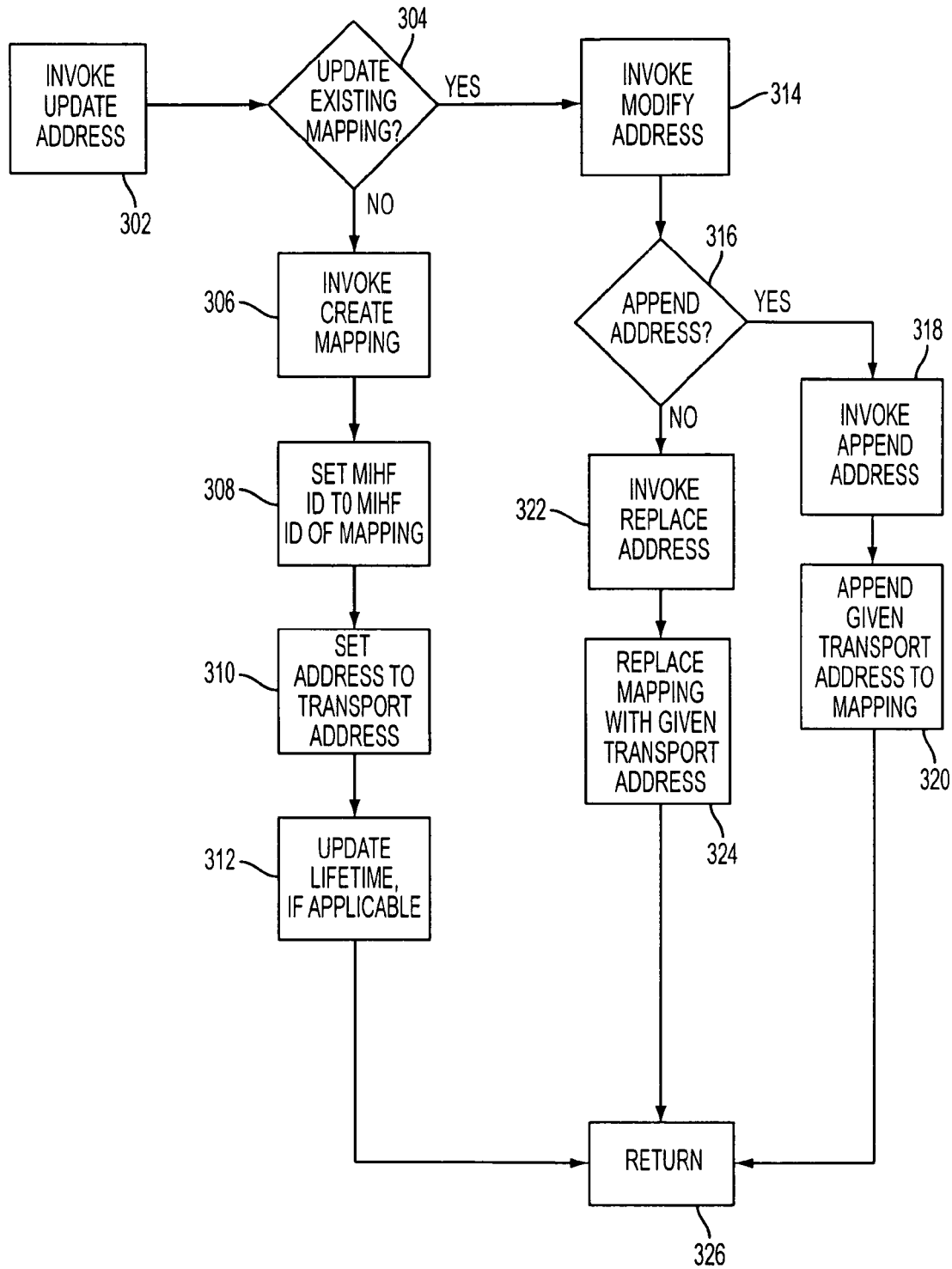
FIG. 3 illustrates a flowchart for invoking an update address operation by a MIH function entity to a mapping table according to the disclosed embodiments.

FIG. 3 depicts a flowchart for invoking an update address operation by a MIH function entity to mapping table 200 according to the disclosed embodiments. Preferably, an update address operation results in a create mapping operation or a modify address operation. The create mapping operation creates a new MIH function-to-transport mapping in mapping table 200. The modify address operation modifies an existing mapping.

The following parameters, which correspond to the columns of mapping table 200 shown in FIG. 2, may be included in any transport protocol message 130 received by PoS 102. The MIH function identifier, such as mobile mode 108, of the new mapping is included. Another parameter is a list of transport addresses that the MIH function identifier should map to. Preferably, the transport addresses correspond to the IP addresses applicable to the MIH entity.

Other parameters include a lifetime value, as shown in column 206 of mapping table 200, which represents the lifetime assigned to the new mapping. Alternatively, this parameter may not be used if not applicable because no lifetime is needed or given. An append parameter is included to indicate whether the given transport list above should be appended or replaced once the mapping is made in mapping table 200.

Step 302 of FIG. 3 executes by invoking an update address operation. A message is received at PoS 102 that includes the parameters disclosed above and an instruction to update an address within mapping table 200. Step 304 executes by verifying if the MIH function identifier, such as mobile node 108, already exists in a mapping.

If step 304 is no, then step 306 is executed by invoking a create mapping operation to create a new mapping within mapping table 200 using the parameter specified above. Step 308 executes by setting the MIH function identifier of the MIH function to the MIH function identifier of the mapping. For example, if mobile node 108 is the new mapping in mapping table 200, as shown by mapping 212, then the disclosed embodiments would place the identifier of mobile node 108 in column 202.

Step 310 executes by setting the transport address or addresses for the new mapping in column 204 to the list of addresses contained within the parameters of the message. Step 312 executes by updating the lifetime of mapping 212, if applicable. In this instance, the lifetime of column 206 is populated if a non-zero value is included for this parameter received by PoS 102. If a zero value is provided, then no value is entered for column 206.

If step 304 determines the update address pertains to an existing mapping, then step 314 executes by invoking a modify address operation. The modification of the mapping is based on appending a new list of transport addresses in column 204 to the mapping or replacing the current list in column 204 of transport addresses with a new one. Whether the modification is based on appending or replacing may be specified by the MIH function with which the mapping is associated.

Step 316 executes by determining whether to invoke the append address operation. The disclosed embodiments may look to the append parameter included in the message received by PoS 102. If step 316 is yes, then step 318 executes by invoking an append address operation. The append address operation appends a transport address to the current list of addresses within column 204 of mapping table 200. The append address operation pertains to mobile nodes that are capable of simultaneous use of multiple interfaces having different transport addresses. For example, in mapping table 200, mappings 214 and 216 for mobile node 106 may include different interfaces.

Step 320 executes by appending the given transport address list to the transport address list of the mapping. The disclosed embodiments determine the existing MIH function identifier for the mapping and the list of transport addresses to append from the parameters in the message. For example, mobile node 110 of mapping 210 may be referenced in message 130. The transport addresses in column 204 may be appended by a list of one or more transport addresses in the parameters within message 130.

If step 316 is no, then step 322 executes by invoking a replace address operation. The replace address operation replaces the current list of transport addresses for a mapping with a new list. Thus, step 324 executes by replacing the transport addresses for a given mapping with a list of addresses provided in the message. As with the append address operation, the parameters applicable for the replace address operation are the MIH function identifier and the list of transport addresses for columns 202 and 204, respectively, of mapping table 200. Step 326 executes by returning the flowchart to the initial state to wait until another message is received at PoS 102.

Thus, when PoS 102 receives MIH protocol message 130 from a mobile node 106, 108 or 110, it invokes an update address operation in which a create address operation may be invoked if there is no MIH function-to-transport mapping associated with the sending mobile node. Message 130 specifies its source MIH function identifier and the source transport address as the MIH function address and the transport address or addresses for entry into mapping table 200. The update address operation may be invoked when the MIH registration request message is received.

When PoS 102 receives MIH protocol message 130, it invokes an update address operation in which either an append address or replace address operation is invoked by specifying the source transport address of message 130 as the input parameter. If there is a mapping associated with the sending peer MIH function, such as mapping 210 and mobile node 110, and the source transport address of message 130 is not found in the list of transport addresses in column 204 for the mapping, then one of these operations is performed.

The decision on which operation is invoked may rely on a new capability option to be exchanged during the MIH capability discovery process, as disclosed in greater detail below. This capability option may be a field within the message that carries data on which operation to invoke. The decision is communicated via the append parameter. When a MIH registration request is received, only the replace address operation may be invoked.

Message 130 also may represent a new event service message, such as a MIH transport address change indication message, that allows a mobile node to notify PoS 102 of a change of the transport address or addresses. This message contains a list of the mobile node transport addresses used for MIH protocol communication. PoS 102 may subscribe to this event and update the MIH function-to-transport mapping associated with the applicable mobile node upon receipt of a MIH transport address change indication message from the mobile node.

The disclosed embodiments also may extend the MIH protocol, such as transport protocol 103, to allow any MIH protocol message 130 to carry an optional attribute that contains a list of transport addresses in addition to other attributes to notify PoS 102 of a change in the transport address or addresses. This option may use an MIH type-length-value (TLV) or add a new parameter in a choice data type carried in an existing TLV.

Figure 4:
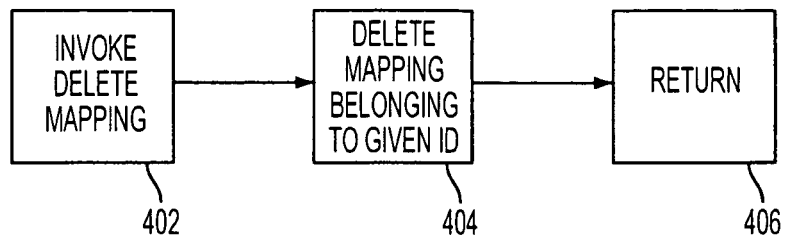
FIG. 4 illustrates a flowchart for invoking a delete mapping operation according to the disclosed embodiments.

FIG. 4 depicts a flowchart for invoking a delete mapping operation according to the disclosed embodiments. A local MIH function may safely remove a mapping within mapping table 200 when a MIH deregistration request message is received for a given MIH function identifier. For example, PoS 102 may receive message 130 requesting mapping 210 for mobile node 110 be removed. Alternatively, a new MIH function indication message may be defined to notify PoS 102 that a specific transport mapping is not used any longer.

Step 402 of FIG. 4 executes by invoking a delete mapping operation in response to a message received at a MIH function, such as PoS 102. The message may include the parameters of an existing MIH function identifier correlating to a mapping in mapping table 200. Step 404 executes by deleting the mapping belonging to the given MIH function identifier from mapping table 200. Step 406 returns the flowchart back to its initial state to await the next message.

Figure 5:
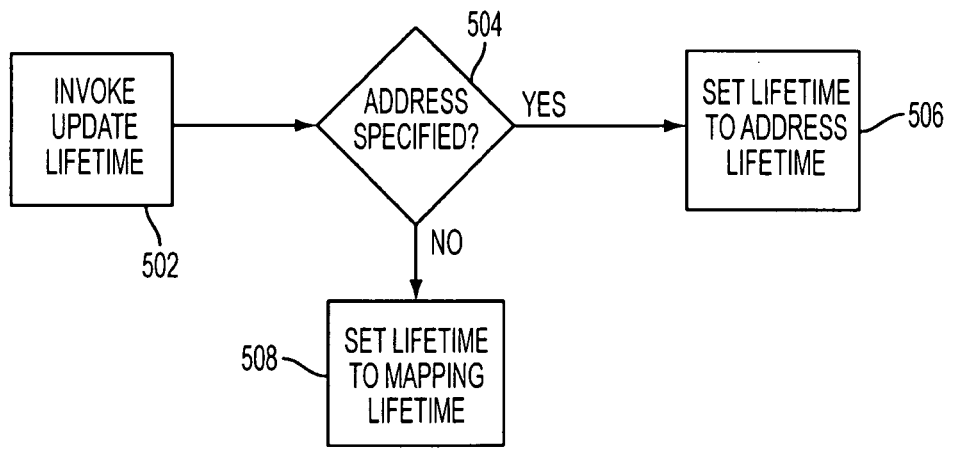
FIG. 5 illustrates a flowchart for invoking an update lifetime operation within a mapping table according to the disclosed embodiments.

FIG. 5 depicts a flowchart for invoking an update lifetime operation within mapping table 200 according to the disclosed embodiments. An update lifetime operation provides an implicit way to remove a MIH function-to-transport mapping associated with a mobile node in which the mapping cannot be explicitly removed by a delete mapping operation due to a persistent communication failure in transmitting a message from the mobile node. A persistent communication failure is detected by maintaining a lifetime of the mapping so that the lifetime is extended when receiving a certain packet from the mobile node before the expiration of the lifetime of the mapping. If the lifetime expires, then a persistent communication failure is determined and the mapping is removed. An update lifetime operation also may be invoked within a create mapping operation.

When a mapping within mapping table 200 has multiple transport addresses, such as mapping 214, a persistent communication failure with one transport address does not necessarily mean a persistent communication failure with the entire mapping if PoS 102, for example, can still communicate with the mobile node using another transport address. Referring to FIG. 2, mapping 214 for mobile node 106 includes IP addresses 116 and 124. If a persistent communication failure occurs for address 116, then PoS 102 may still communicate via IP address 124. As noted above, the IP addresses can be used as transport addresses, as shown in mapping table 200.

A lifetime may be associated with each transport address and the largest lifetime among differing address lifetimes in the mapping becomes the lifetime of the mapping. The parameters applicable in an update lifetime operation are the existing MIH function-to-transport mapping, transport address or addresses, and a lifetime value that represents a period of time or cycles until the mapping is removed. This period preferably commences immediately after completion of the update lifetime operation. With regard to the transport address parameter, if the lifetime value is not associated with a particular transport address, then this parameter may be omitted.

Referring to FIG. 5, step 502 executes by invoking an update lifetime operation. The lifetimes of mappings may be found in column 206 of mapping table 200. Step 504 executes by determining whether a transport address is specified. If yes, then step 506 executes by setting the lifetime within column 206 of the mapping to the address lifetime of the specified transport address. For example, if mapping 214 receives a message that specified transport address 116, then the lifetime value in column 206 is set to the lifetime value for that address. If step 504 is no, then step 508 executes by setting the lifetime of the mapping to the lifetime value of the mapping. Thus, using the example above, mapping 214 would have a single lifetime value within column 214.

Any MIH protocol message exchange that does not induce a peer state change can be used for an update lifetime operation. Some examples are disclosed below, with reference to the elements of FIG. 1 where applicable. These examples show the use of the existing MIH protocol messages to invoke an update lifetime operation.

In one example, PoS 102 send a MIH request message 132 to mobile node 110 before the lifetime of mapping 210 expires. An update lifetime operation is invoked when MIH response message 130 is received from mobile node 110. If PoS 102 uses per-transport-address lifetimes, then message 132 may be sent to a specific transport address when PoS 102 intends to update the lifetime of the specific transport address.

An existing or new MIH request/response message exchange can act as a ping mechanism to verify if mapping 210 is still valid. In this example, PoS 102 sends a request message, or message 132, to mobile node 110 with an empty list of link identifiers before the lifetime of mapping 210 expires. Mobile node 110 responds with a response message 130 with a list of link identifiers for its interfaces. PoS 102 invokes an update lifetime operation when receiving message 130. The applicable request/response messages may be defined to carry no attribute other than source and destination MIH function identifiers. These types of messages, such as MIH ping request and response messages, are disclosed in greater detail below.

Periodic MIH indication messages can act as heartbeats to indicate that a specific MIH function-to-transport mapping or a specific transport address in the mapping is still valid. PoS 102 invokes an update lifetime operation when such an indication message is received. An existing or new MIH indication message may be used for such a purpose.

As an example, PoS 102 may use a command primitive to subscribe to mobile node 110 for an event by specifying a time interval. Mobile node 110 periodically sends an indication message to PoS 102. Message 130 may act as the indication message in this example. PoS 102 invokes an update lifetime operation upon receipt of the indication message. Using the example, a MIH_Heartbeat indication message may be defined to carry no attribute other than source and destination MIH function identifiers. The MIH_Heartbeat indication message is disclosed in greater detail below.

IF MIH transport protocol 103 operates above IP, then an ICMP domain name request and reply message exchange can be used for realizing an update lifetime operation. PoS 102 periodically sends an ICMP domain name request message to a mobile node using an IP address in the mapping associated with the mobile node as the destination IP address of the message. The data field of the ICMP domain name request message includes a request for a MIH function identifier of the mobile node.

The data field of the ICMP domain name reply message responded by the mobile node includes the MIH function identifier of the mobile node. If the source IP address of the ICMP domain name reply message and the MIH function identifier included in the data field of the ICMP domain name reply message matches an existing mapping in mapping table 200, then an update lifetime operation is invoked by specifying the time to perform the next ICMP domain name request and reply exchange as the lifetime value parameter.

Figure 6:
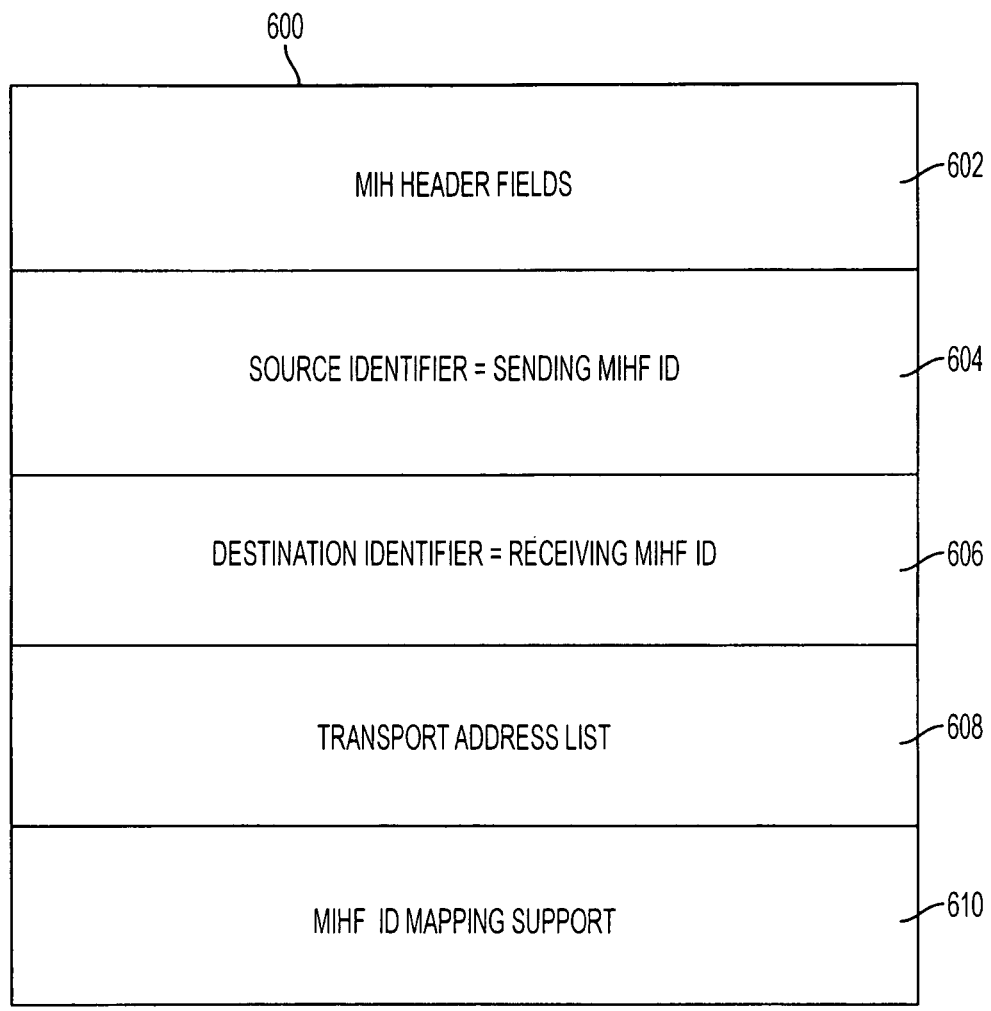
FIG. 6 illustrates a message format for messages sent and received by a MIH function within a network according to the disclosed embodiments.

FIG. 6 depicts a message format for messages sent and received by a MIH function within network 100 according to the disclosed embodiments. Message 600 includes fields that may or may not be used by the different types of messages disclosed below. Message 600 may correspond to messages 130 or 132 shown in FIG. 1, such that the format may be used by messages 130 and 132 in communicating between entities within network 100. Message 600 include five fields that carry information for use by the entities, but is not limited to these number of fields or even using all five fields. MIH header fields 602 are applicable to every type of message 600, and may include various codes to identify the type of message 600.

Message 600 may be a MIH capability discover request and response message. This type of message adds a new type-length-value (TLV) field 610 in an MIH capability discovery request and response message. The TLV allows the originating MIH function to indicate the default behavior on how the peer MIH function should update the mapping entry associated with the originating MIH function. A data type referred to as MIHF ID Mapping Support may be defined. A value of this data type is carried in MIHF ID mapping support TLV field 610 within message 600.

When MIHF ID mapping support TLV field 610 is not present within message 600 or the value is set to zero (0), or do not care, then the local node has no preference on how the mapping entry within mapping table 200 is updated. This feature allows a device without the MIH function-to-transport address feature to interoperate with a device that does support the mapping.

Message 600 may be in a format for a MIH transport address change message. A transport address list TLV field 608 provides the information of the transport addresses that is mapped to the MIH function identifier in source identifier field 604. The MIH function identifier within field 604 may match one in column 202 of mapping table 200. The optional MIHF ID mapping support TLV field 610 indicates if the provided address list is for appending or replacing the mapping entries, as disclosed by FIG. 3. Destination identifier field 606 also may be applicable for the MIH transport address change message.

Message 600 also may be a MIH ping request and response message. From the source transport address, source identifier field 604 and the optional MIHF ID mapping support TLV field 610 can update the appropriate mapping within mapping table 200. Further, any updates on the mapping entry can be carried in the response message.

Message 600 also may be a MIH heartbeat message that periodically sends an update of the MIH function-to-transport mapping information to a peer MIH function. For example, PoS 102 may periodically send information to mobile nodes 106, 108 and 110. Transport address list field 608 and MIHF ID mapping support TLV field 610 may include the information on how a mapping should be updated. Heartbeat messages may be used for update lifetime operations to keep a lifetime value from running down and a mapping within mapping table 200 "alive."

It will be apparent to those skilled in the art that various modifications and variations can be made in the disclosed embodiments of the present invention without departing from the spirit or scope of the invention. Thus, it is intended that the present invention covers the modifications and variations of the embodiments disclosed above provided that they come within the scope of any claims and their equivalents.

What is claimed is:

1. A method for maintaining mapping between entities within a media-independent handover (MIH) environment, the method comprising:
   accessing a mapping table corresponding to a MIH function to obtain at least one transport address corresponding to a peer MIH function, wherein the at least one transport address corresponding to the peer MIH function is used by a MIH transport protocol to maintain mapping between an identifier identifying the peer MIH function and said transport address; and
   invoking an operation regarding a mapping of the at least one transport address in the mapping table based on a change of a status of the peer MIH function,
   wherein invoking an append operation to append the transport address, specified by the MIH function with which the mapping is associated, when determined that the operation pertains to a peer MIH function configured to simultaneously use multiple interfaces having different transport addresses.

2. The method of claim 1, wherein the peer MIH function is a mobile node.

3. The method of claim 1, wherein the step of invoking an operation includes invoking an update address operation that updates the at least one transport address in the mapping table.

4. The method of claim 3, wherein the step of invoking the update address operation includes invoking a create address operation to create the at least one transport address in the mapping table.

5. The method of claim 3, wherein the step of invoking the update address operation includes modifying the at least one transport address within the mapping table.

6. The method of claim 1, wherein the step of invoking the operation includes deleting a mapping of the at least one transport address from the mapping table.

7. The method of claim 1, wherein the step of invoking the operation includes updating a lifetime of a mapping within the mapping table.

8. The method of claim 1, further comprising receiving a message having fields to invoke the operation, wherein at least one field includes a source identifier that indicates the peer MIH function.

9. The method of claim 8, wherein the message includes a heartbeat message.

10. A method for maintaining mapping within a media-independent handover (MIH) network having at least two MIH functions, the method comprising:
    generating a mapping table at a MIH function, wherein the mapping table includes a mapping having a MIH function identifier, a list of transport addresses and a lifetime value;
    receiving a message at the MIH function from a peer MIH function;
    invoking an operation to update or delete the mapping in response to the message,
    wherein the list of transport addresses in the mapping table of the MIH function correspond to the transport addresses of the peer MIH function being used by a MIH transport protocol to maintain mapping between an identifier identifying the peer MIH function and said transport addresses; and
    invoking an append operation to append the transport addresses, specified by the MIH function with which the mapping is associated, when determined that the operation pertains to a peer MIH function configured to simultaneously use multiple interfaces having different transport addresses.

11. The method of claim 10, wherein the invoking step includes invoking a create mapping operation to create the mapping in the mapping table using a source identifier and transport address list within the message.

12. The method of claim 10, wherein the invoking step includes invoking a modify address operation to modify the mapping within the mapping table using information within fields of the message.

13. The method of claim 12, wherein the invoking the modify address operation step includes replacing the list of transport addresses within the mapping.

14. The method of claim 12, wherein the invoking the modify address operation step includes appending at least one new transport address to the list of transport addresses.

15. The method of claim 10, further comprising receiving the message using a MIH transport protocol.

16. A node including media-independent handover (MIH) function within a network having a MIH transport protocol, the function comprising:
    a mapping table including a mapping to communicate with another MIH function within the network, wherein the mapping includes a MIH function identifier, a list of transport addresses and a lifetime value corresponding the another MIH function; and
    a transport protocol to provide a message from the another MIH function that invokes an operation to maintain the mapping based upon information within the fields of the message,
    wherein the list of transport addresses corresponding to said another MIH function is used by said transport protocol to maintain mapping between an identifier identifying said another MIH function and said list of transport addresses, and
    wherein when said another MIH function is configured to simultaneously use multiple interfaces having different transport addresses, said transport protocol provides a message from said another MIH function to invoke an append operation in order to append the transport addresses specified by a MIH function with which the mapping is associated.

17. The node including MIH function of claim 16, wherein the MIH function includes a point of service function.

18. The node including MIH function of claim 16, wherein the node a mobile node.

19. The node including MIH function of claim 16, wherein the mapping includes a lifetime value that indicates when the mapping is to be deleted unless updated.

20. The node including MIH function of claim 19, wherein the lifetime value is assigned per a transport address.

21. A method of maintaining mapping at an entity within a media-independent handover (MIH) environment, the method comprising:
    receiving a message at the entity indicating an operation to be invoked regarding a mapping within a mapping table at the entity, wherein the mapping table is used in communications by the entity;
    performing the operation for the mapping in the mapping table, wherein the operation updates a list of transport addresses in the mapping; and
    updating a lifetime value for the mapping based on information within a field in the message,
    wherein the list of transport addresses in the mapping table at the entity corresponding to the transport addresses of another entity within the media-independent handover environment are used by a MIH transport protocol to maintain mapping between an identifier identifying said another entity and said transport addresses, and
    wherein when said another entity is configured to simultaneously use multiple interfaces having different transport addresses, receiving a message at the entity indicating an append operation to be invoked regarding a mapping at the entity so as to append the transport addresses within the mapping table, said transport addresses are specified by a MIH function with which the mapping is associated.

22. The method of claim 21, wherein the updating step includes assigning the lifetime value per a transport address.

* * * * *

UNITED STATES PATENT AND TRADEMARK OFFICE
CERTIFICATE OF CORRECTION

PATENT NO. : 8,514,808 B2  
APPLICATION NO. : 12/258581  
DATED : August 20, 2013  
INVENTOR(S) : Cheng et al.

Page 1 of 1

It is certified that error appears in the above-identified patent and that said Letters Patent is hereby corrected as shown below:

On the Title Page, in Item (54), and in the Specification, in Column 1, Line 2, in Title, delete "MEDIA" and insert -- MEDIA- --, therefor.

In the Specification

In Column 8, Line 64, delete "column 214." and insert -- column 206. --, therefor.

In the Claims

In Column 12, Line 30, in Claim 18, delete "node a" and insert -- node is a --, therefor.

Signed and Sealed this
Fourteenth Day of April, 2015

Michelle K. Lee
*Director of the United States Patent and Trademark Office*